United States Patent
Gu et al.

(10) Patent No.: US 9,318,949 B2
(45) Date of Patent: Apr. 19, 2016

(54) AC-TO-DC POWER SUPPLY APPARATUS AND POWER CONTROL STRUCTURE AND METHOD THEREOF

(71) Applicants: Lin-Lin Gu, Nanjing (CN); Chuan-Yun Wang, Nanjing (CN); Ming Xu, Nanjing (CN); Ju-Lu Sun, Nanjing (CN)

(72) Inventors: Lin-Lin Gu, Nanjing (CN); Chuan-Yun Wang, Nanjing (CN); Ming Xu, Nanjing (CN); Ju-Lu Sun, Nanjing (CN)

(73) Assignees: FSP TECHNOLOGY INC., Taoyuan (TW); FSP-Powerland Technology Inc., Nanjing (CN)

( * ) Notice: Subject to any disclaimer, the term of this patent is extended or adjusted under 35 U.S.C. 154(b) by 662 days.

(21) Appl. No.: 13/626,892

(22) Filed: Sep. 26, 2012

(65) Prior Publication Data
US 2013/0077370 A1 Mar. 28, 2013

(30) Foreign Application Priority Data
Sep. 26, 2011 (CN) .......................... 2011 1 0286478

(51) Int. Cl.
*H02M 1/42* (2007.01)
*H02M 3/156* (2006.01)
*H02M 1/00* (2007.01)

(52) U.S. Cl.
CPC ............ *H02M 1/4225* (2013.01); *H02M 3/156* (2013.01); *H02M 2001/0025* (2013.01); *Y02B 70/126* (2013.01)

(58) Field of Classification Search
CPC ....... G05F 1/70; H02M 1/4225; H02M 3/156; H02M 2001/0025
USPC ........ 323/207, 222, 223, 300; 363/74, 78, 79, 363/80, 84, 89
See application file for complete search history.

(56) References Cited

U.S. PATENT DOCUMENTS

| | | | | |
|---|---|---|---|---|
| 3,805,142 A * | 4/1974 | Rando | ................. | H02M 3/3155 361/100 |
| 5,003,454 A * | 3/1991 | Bruning | .............. | H02M 1/4225 323/222 |
| 5,070,516 A * | 12/1991 | Le Comte | ........... | H04L 25/4917 327/50 |
| 7,538,525 B2 * | 5/2009 | Kim | .......................... | G05F 1/70 323/205 |
| 2009/0016087 A1* | 1/2009 | Shimizu | .............. | H02M 1/4225 363/89 |
| 2010/0097829 A1* | 4/2010 | Uno | .................... | H02M 1/4225 363/124 |
| 2012/0112720 A1* | 5/2012 | Remmert | ................ | H02M 3/28 323/283 |

FOREIGN PATENT DOCUMENTS

TW    I323971    4/2010

OTHER PUBLICATIONS

"Office Action of Taiwan Counterpart Application", issued on Aug. 4, 2014, p. 1-p. 12.

* cited by examiner

*Primary Examiner* — Jue Zhang
*Assistant Examiner* — Lakaisha Jackson
(74) *Attorney, Agent, or Firm* — Jianq Chyun IP Office

(57) ABSTRACT

An AC-to-DC power supply apparatus and a power control structure and method thereof are provided. The provided method includes: making an AC-to-DC converter in the AC-to-DC power supply apparatus convert an AC input voltage in response to a driving signal, so as to generate a DC output voltage; sampling a rectified voltage relating to the AC input voltage, so as to provide a sampling signal; providing an output feedback signal relating to an output of the AC-to-DC converter; multiplying the sampling signal by the output feedback signal, so as to provide a product signal; performing a signal modulation on the product signal, so as to generate the driving signal to control a switching of a main power switch in the AC-to-DC converter; and performing an amplitude-limiting process on the sampling signal or the product signal.

26 Claims, 13 Drawing Sheets

US 9,318,949 B2

AC-TO-DC POWER SUPPLY APPARATUS AND POWER CONTROL STRUCTURE AND METHOD THEREOF

CROSS-REFERENCE TO RELATED APPLICATION

This application claims the priority benefit of China application serial no. 201110286478.1, filed on Sep. 26, 2011. The entirety of the above-mentioned patent application is hereby incorporated by reference herein and made a part of this specification.

BACKGROUND OF THE INVENTION

1. Field of the Invention

The present invention relates to a power supply technology, more particularly, to an AC-to-DC power supply apparatus and a power control structure and method thereof.

2. Description of the Related Art

An AC-to-DC converter is configured to convert an AC power (for example, city power) into a DC power, and supply the converted DC power to a load. Currently, the input power-factor and the harmonic content of the input current in the power supply have a variety of standard limitations. Accordingly, the configuration of the power-factor-correction (PFC) circuit in the AC-to-DC converter is generally the boost PFC converter.

The inductor in the boost PFC converter has a larger volume, and the effective cross section area ($A_e$) of the magnetic core of the inductor can be determined and calculated by the following expression (1):

$$A_e = \frac{L_b \times i_{Lb\_pk\_max}}{N \times B_{max}}. \qquad (1)$$

In foregoing expression (1), $L_b$ represents that the inductance of the inductor, $i_{Lb\_pk\_max}$ represents that the maximum peak current of the inductor, N represents that the number of turns of the inductor, and $B_{max}$ represents that the maximum magnetic flux density.

It is clearly seen that, in foregoing expression (1), the volume of the inductor is closely related to the maximum peak current of the inductor ($i_{Lb\_pk\_max}$). Accordingly, the effective cross section area ($A_e$) of the magnetic core of the inductor increases as the maximum peak current ($i_{Lb\_pk\_max}$) of the inductor increases (the effective cross section area ($A_e$) of the magnetic core of the inductor is proportional to the maximum peak current ($i_{Lb\_pk\_max}$) of the inductor), but the power density of the AC-to-DC converter decreases as the volume of the inductor increases.

SUMMARY OF THE INVENTION

In order to increase the power density of the AC-to-DC converter, the invention is directed to an AC-to-DC power supply apparatus and a power control structure and method thereof, so as to decrease the volume of the magnetic component (for example, inductor or transformer) in the AC-to-DC converter, and further be capable of complying with the standard requirements of the power factor (PF) and total harmonics distortion (THD).

An exemplary embodiment of the invention provides an (AC-to-DC) power supply apparatus including an AC-to-DC converter and a control unit. The AC-to-DC converter is configured to receive an AC input voltage, and convert the AC input voltage in response to a driving signal, so as to generate a DC output voltage. The control unit is connected to the AC-to-DC converter, and configured to generate the driving signal to control a switching of a main power switch in the AC-to-DC converter. The control unit includes: a sampling circuit, an output feedback circuit, a multiplying circuit, a signal modulation circuit, and an amplitude-limiting circuit.

The sampling circuit is configured to sample a rectified voltage relating to the AC input voltage, so as to provide and output a sampling signal. The output feedback circuit is configured to provide and output an output feedback signal relating to an output of the AC-to-DC converter. The multiplying circuit is configured to multiply the sampling signal by the output feedback signal, so as to provide and output a product signal. The signal modulation circuit is configured to perform a signal modulation on the product signal, so as to generate the driving signal. The amplitude-limiting circuit is coupled between the sampling circuit and the multiplying circuit or between the multiplying circuit and the signal modulation circuit, and configured to perform an amplitude-limiting process on an output of the sampling circuit or an output of the multiplying circuit.

In an exemplary embodiment of the invention, in case that the amplitude-limiting circuit is coupled between the sampling circuit and the multiplying circuit, the amplitude-limiting circuit includes: a first to a third operational amplifiers, a first and a second diodes, a capacitor, and a first to a fourth resistors. A positive input terminal of the first operational amplifier is configured to receive the sampling signal. A positive input terminal of the second operational amplifier is connected to the positive input terminal of the first operational amplifier, and a negative input terminal and an output terminal of the second operational amplifier are coupled with each other. An anode of the first diode is connected to an output terminal of the first operational amplifier, and a cathode of the first diode is connected to a negative input terminal of the first operational amplifier.

A first terminal of the capacitor is connected to the cathode of the first diode, and a second terminal of the capacitor is grounded. The first resistor is coupled with the capacitor in parallel. A first terminal of the second resistor is connected to the cathode of the first diode. A first terminal of the third resistor is connected to a second terminal of the second resistor, and a second terminal of the third resistor is grounded. A positive input terminal of the third operational amplifier is connected to the second terminal of the second resistor, and a negative input terminal and an output terminal of the third operational amplifier are coupled with each other. A cathode of the second diode is connected to the output terminal of the third operational amplifier, and an anode of the second diode is connected to a first input terminal of the multiplying circuit. A first terminal of the fourth resistor is connected to the output terminal of the second operational amplifier, and a second terminal of the fourth resistor is connected to the anode of the second diode.

In another exemplary embodiment of the invention, in case that the amplitude-limiting circuit is coupled between the sampling circuit and the multiplying circuit, the amplitude-limiting circuit includes a voltage-regulator diode. A cathode of the voltage-regulator is configured to receive the sampling signal, and is connected to a first input terminal of the multiplying circuit. An anode of the voltage-regulator is grounded.

In an exemplary embodiment of the invention, in case that the amplitude-limiting circuit is coupled between the sampling circuit and the multiplying circuit, the output feedback signal is provided to a second input terminal of the multiplying circuit, and the multiplying circuit further has an output terminal providing and outputting the product signal to the signal modulation circuit. Moreover, the sampling signal is a voltage-dividing signal.

In an exemplary embodiment of the invention, in case that the amplitude-limiting circuit is coupled between the multiplying circuit and the signal modulation circuit, the amplitude-limiting circuit includes a voltage-regulator diode. A cathode of the voltage-regulator diode is connected to an output terminal of the multiplying circuit, and an anode of the voltage-regulator diode is grounded. In this case, the sampling signal is provided to a first input terminal of the multiplying circuit, and is a voltage-dividing signal. Moreover, the output feedback signal is provided to a second input terminal of the multiplying circuit, and the output terminal of the multiplying circuit provides and outputs the product signal to the signal modulation circuit.

In an exemplary embodiment of the invention, when the output of the AC-to-DC converter is the DC output voltage of the AC-to-DC converter, the output feedback signal is an error signal corresponding to a difference between the DC output voltage and a reference signal.

In an exemplary embodiment of the invention, when the output of the AC-to-DC converter is an output current of the AC-to-DC converter, the output feedback signal is an error signal corresponding to a difference between the output current and a reference signal.

In an exemplary embodiment of the invention, the signal modulation process may be a pulse-width-modulation (PWM) process.

In an exemplary embodiment of the invention, control unit is implemented by at least a digital signal processor (DSP).

An exemplary embodiment of the invention also provides a power control method adapted to an AC-to-DC converter, and the power control method includes: making the AC-to-DC converter convert an AC input voltage in response to a driving signal, so as to generate a DC output voltage; sampling a rectified voltage relating to the AC input voltage, so as to provide a sampling signal; providing an output feedback signal relating to an output of the AC-to-DC converter; multiplying the sampling signal by the output feedback signal, so as to provide a product signal; performing a signal modulation on the product signal, so as to generate the driving signal to control a switching of a main power switch in the AC-to-DC converter; and performing an amplitude-limiting process on the sampling signal or the product signal.

An exemplary embodiment of the invention also provides a power control structure adapted to an AC-to-DC converter, and the configuration of the power control structure is similar to that of the control unit of the provided power supply apparatus.

From the above, the maximum peak current of the inductor in the AC-to-DC converter can be limited or decreased under the provided power control structure and method both capable of complying with the standard requirements of the power factor (PF) and total harmonics distortion (THD), such that the volume of the magnetic component (for example, inductor or transformer) in the AC-to-DC converter can be decreased, and thus increasing the power density of the AC-to-DC converter.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
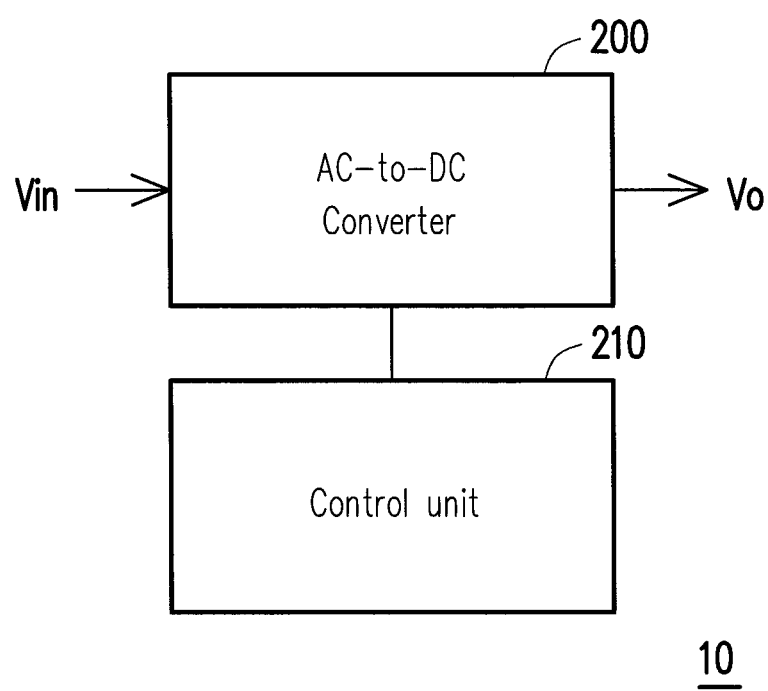
FIG. 1 is a diagram of a power supply apparatus 10 according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
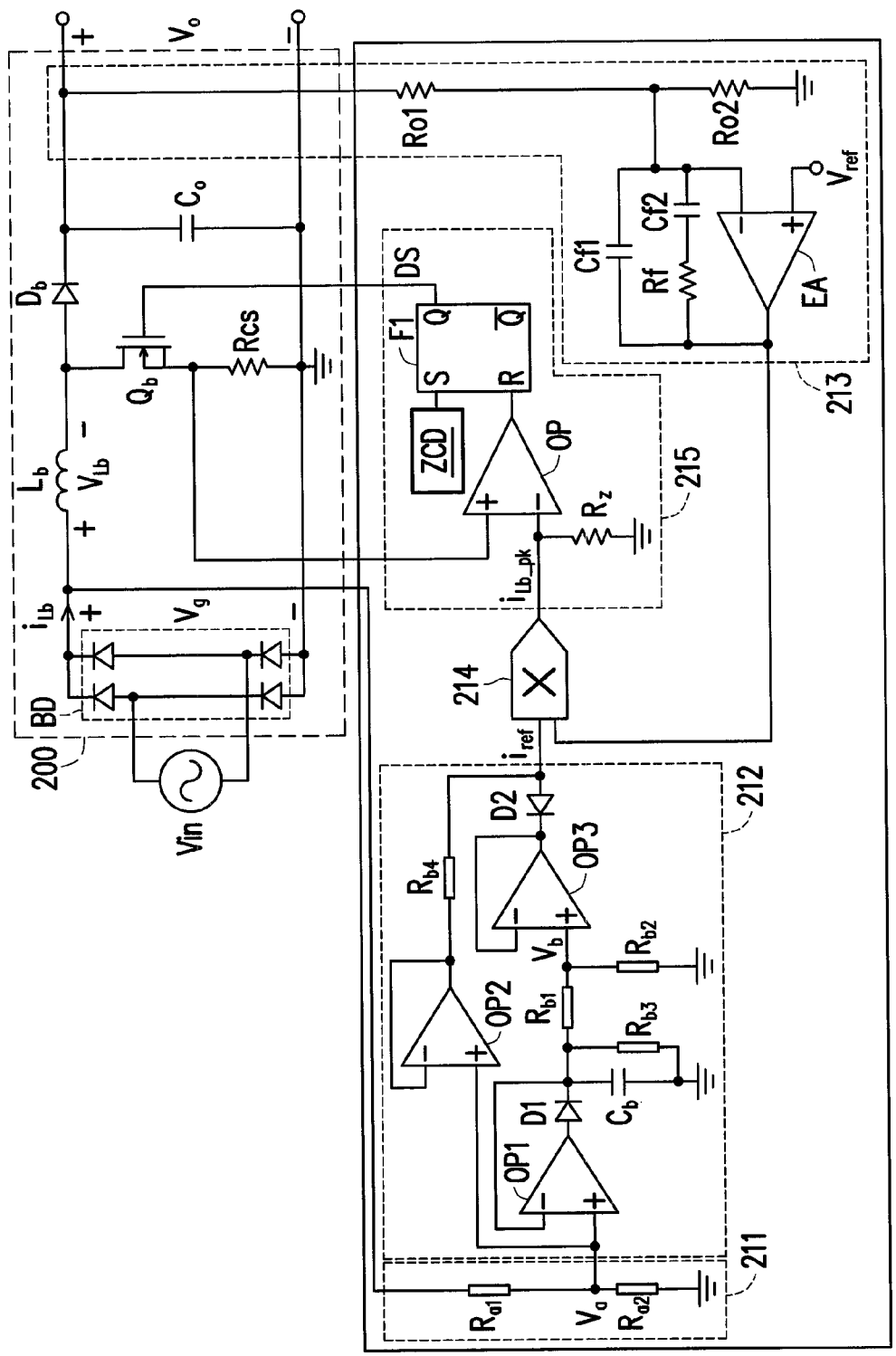
FIG. 2 is an implementation diagram of the power supply apparatus 10 of FIG. 1.

FIG. 1 is a diagram of a power supply apparatus 10 according to an exemplary embodiment of the invention, and FIG. 2 is an implementation diagram of the power supply apparatus 10 of FIG. 1. Referring to FIGS. 1 and 2, the power supply apparatus 10 is an AC-to-DC power supply apparatus, and includes an AC-to-DC converter 200 and a control unit 210. It is noted that the configuration of the power-factor-correction (PFC) circuit in the AC-to-DC converter 200 is the boost PFC converter, and the control unit 210 controls the operation of the AC-to-DC converter 200 under the boundary current mode (BCM).

The AC-to-DC converter 200 is configured to receive an AC input voltage Vin, and convert the AC input voltage Vin in response to a driving signal DS from the control unit 210, so as to generate and provide a DC output voltage Vo to a load. In this exemplary embodiment, the AC-to-DC converter 200 is composed of a bridge-rectifier BD, an inductor Lb, a main power switch Qb, a resistor Rcs, a diode Db and a capacitor Co. The bridge-rectifier BD is configured to receive and rectify the AC input voltage Vin, so as to generate a rectified voltage Vg. The inductor Lb and the diode Db are connected in series between the positives (+) of the rectified voltage Vg and the DC output voltage Vo, and the negatives (−) of the rectified voltage Vg and the DC output voltage Vo are grounded. The main power switch Qb and the resistor Rcs are connected in series between the ground potential and the common node of the inductor Lb and the diode Db. The capacitor Co is connected between the positive (+) of the DC output voltage Vo and the ground potential.

The control unit 210 is connected to the AC-to-DC converter 200, and configured to generate the driving signal DS to control the switching of a main power switch Qb in the AC-to-DC converter 200. In this exemplary embodiment, the control unit 210 includes a sampling circuit 211, an amplitude-limiting circuit 212, an output feedback circuit 213, a multiplying circuit 214, and a signal modulation circuit 215.

The sampling circuit 211 is configured to sample the rectified voltage Vg relating to the AC input voltage Vin, so as to provide and output a sampling signal Va. In this exemplary embodiment, the sampling circuit 211 may be composed of two resistors Ra1 and Ra2 connected in series between the positive (+) of the rectified voltage Vg and the ground potential, so the sampling signal Va can be seen as a voltage-dividing signal relating to the rectified voltage Vg.

The amplitude-limiting circuit 212 is coupled between the sampling circuit 211 and the multiplying circuit 214, and is configured to perform an amplitude-limiting process on an output of the sampling circuit 211 (i.e. the sampling signal Va). In this exemplary embodiment, the amplitude-limiting circuit 212 includes operational amplifiers (OP1, OP2, OP3), diodes (D1, D2), a capacitor Cb, and resistors (Rb1, Rb2, Rb3, Rb4). The positive input terminal (+) of the operational amplifier OP1 is configured to receive the sampling signal Va.

The positive input terminal (+) of the operational amplifier OP2 is connected to the positive input terminal (+) of the operational amplifier OP1, and the negative input terminal (−) and the output terminal of the operational amplifier OP2 are coupled with each other. The anode of the diode D1 is connected to the output terminal of the operational amplifier OP1, and the cathode of the diode D1 is connected to the negative input terminal (−) of the operational amplifier OP1.

The first terminal of the capacitor Cb is connected to the cathode of the diode D1, and the second terminal of the capacitor Cb is grounded. The resistor Rb3 is coupled with the capacitor Cb in parallel. The first terminal of the resistor Rb1 is connected to the cathode of the diode D1. The first terminal of the resistor Rb2 is connected to a second terminal of the resistor Rb1, and the second terminal of the resistor Rb2 is grounded. The positive input terminal (+) of the operational amplifier OP3 is connected to the second terminal of the resistor Rb1, and the negative input terminal (−) and the output terminal of the operational amplifier OP3 are coupled with each other.

The cathode of the diode D2 is connected to the output terminal of the operational amplifier OP3, and the anode of the diode D2 is connected to the first input terminal of the multiplying circuit 214. The first terminal of the resistor Rb4 is connected to the output terminal of the operational amplifier OP2, and the second terminal of the resistor Rb4 is connected to the anode of the diode D2.

The output feedback circuit 213 is configured to provide and output an output feedback signal Ve relating to an output of the AC-to-DC converter 200 (i.e. the DC output voltage Vo). In this exemplary embodiment, the output feedback circuit 213 is composed of resistors (Ro1, Ro2, Rf), capacitors (Cf1, Cf2), and an error amplifier EA. The resistors (Ro1, Ro2) are connected in series between the positive (+) of the DC output voltage Vo and the ground potential. The positive input terminal (+) of the error amplifier EA is configured to receive a reference signal Vref, and the negative input terminal (−) of the error amplifier EA is connected to the common node of the resistors (Ro1, Ro2). The capacitor Cf1 is connected between the negative input terminal (−) and the output terminal of the error amplifier EA, and the resistor Rf and the capacitor Cf1 are connected in series between the negative input terminal (−) and the output terminal of the error amplifier EA. It is noted that the output feedback signal Ve is provided to a second input terminal of the multiplying circuit 214, and the output feedback signal Ve is an error signal corresponding to a difference between the DC output voltage Vo and the reference signal Vref.

The multiplying circuit 214 is configured to multiply the output ($i_{ref}$) of the amplitude-limiting circuit 212 by the output (Ve) of the output feedback circuit 213, so as to provide and output a product signal $i_{Lb\_pk}$. In this exemplary embodiment, the output ($i_{ref}$) of the amplitude-limiting circuit 212 is obtained by performing the amplitude-limiting process on the sampling signal Va through the amplitude-limiting circuit 212. Moreover, the multiplying circuit 214 further has an output terminal providing and outputting the product signal $i_{Lb\_pk}$ to the signal modulation circuit 215, wherein the product signal $i_{Lb\_pk}$ is the reference of the (maximum) peak current of the inductor Lb.

The signal modulation circuit 215 is configured to perform a signal modulation on the product signal $i_{Lb\_pk}$, so as to generate the driving signal DS to control the switching of the main power switch Qb in the AC-to-DC converter 200. In this exemplary embodiment, the signal modulation circuit 215 is composed of a zero crossing detection circuit ZCD, an operational amplifier OP, an SR flip-flop F1 and a resistor Rz. The zero crossing detection circuit ZCD is configured to detect the zero crossing signal of the current $i_{Lb}$ of the inductor Lb during each switching cycle of the AC-to-DC converter 200.

The negative input terminal (−) of the amplifier OP is connected to the output of the multiplying circuit 214, the positive input terminal (+) of the amplifier OP is connected to the common node of the main power switch Qb and the resistor Rcs, and the output terminal of the operational amplifier OP is connected to the reset terminal R of the SR flip-flop F1. The resistor Rz is connected between the negative input terminal (−) of the operational amplifier OP and the ground potential. The set terminal S of the SR flip-flop F1 is connected to the zero crossing detection circuit ZCD. The output terminal Q is connected to the gate of the main power switch Qb, and configured to output the driving signal DS to control the switch of the main power switch Qb.

In this exemplary embodiment, when the zero crossing detection circuit ZCD detects that the current $i_{Lb}$ of the inductor Lb drops to zero, the main power switch Qb would be turned on in response the driving signal DS from the signal modulation circuit 215, and meanwhile, the diode Db is cut off, such that, at this time, the cross voltage $V_{LB}$ of the inductor Lb is equal to Vg, and then the current $i_{Lb}$ of the inductor Lb would linearly increase from zero according to the slope of Vg/Lb. When the current $i_{Lb}$ of the inductor Lb rises to the product signal $i_{Lb\_pk}$ which is the reference of the (maximum) peak current of the inductor Lb, the main power switch Qb would be turned off in response the driving signal DS from the signal modulation circuit 215, and meanwhile, the current $i_{Lb}$ of the inductor Lb is freewheeling through the diode Db, such that, at this time, the cross voltage $V_{Lb}$ of the inductor Lb is equal to Vg−Vo, and the current $i_{Lb}$ of the inductor Lb would decrease according to the slope of (Vo−Vg)/Lb.

Figure 3:
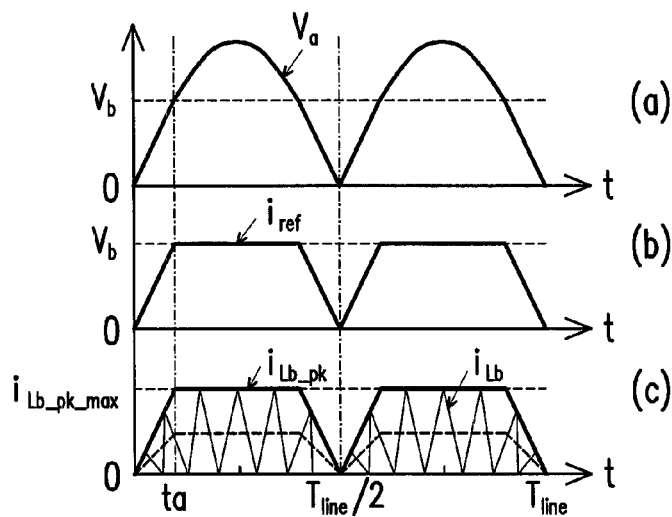
FIGS. 3(a)-3(c) are a part of operation waveforms (Va, Vb, $i_{ref}$, $i_{Lb\_pk}$, $i_{Lb}$) of the power supply apparatus 10 in FIG. 2.

FIGS. 3(a)-3(c) are a part of operation waveforms (Va, Vb, $i_{ref}$, $i_{Lb\_pk}$, $i_{Lb}$) of the power supply apparatus 10 in FIG. 2. Referring to FIGS. 3(a)-3(c), the relationship between the sampling voltage Va and the voltage Vb on the common node of the resistors (Rb1, Rb2) and the operational amplifier OP3 is shown as FIG. 3(a), and T$_{line}$ represents that the cycle of power frequency. In addition, as shown in FIG. 3(b), the voltage Vb on the common node of the resistors (Rb1, Rb2) and the operational amplifier OP3 is almost a constant voltage and can be represent as the following expression (2):

$$\frac{Vb}{V_{Cb}} = \frac{R_{b2}}{R_{b1} + R_{b2}} < 1. \tag{2}$$

In forgoing expression (2), V$_{Cb}$ represents that the voltage on the capacitor Cb, R$_{b1}$ represents that the resistance of the resistor Rb1, and R$_{b2}$ represents that the resistance of the resistor Rb2.

When Va<Vb, i$_{ref}$=Va; and when Va>Vb, i$_{ref}$=Vb. Accordingly, the maximum i$_{Lb\_pk\_max}$ of the output (i$_{ref}$) of the multiplying circuit 214 can be decreased by designing the relationship of Rb1 and Rb2. Moreover, the start point ta of signal amplitude-limiting is only relating to the ratio of Va and Vb, and is not varied with the variation of the input (i.e. the rectified voltage Vg). Accordingly, the power supply apparatus 10 as shown in FIG. 2 can be applied in the wide input range applications/occasions.

It is clearly seen from FIGS. 3(a)-3(c) that the average of i$_{Lb}$ is the same as the waveform of i$_{Lb\_pk}$, and the phase of i$_{Lb\_pk}$ is the same as the rectified voltage Vg, so if the start point ta of signal amplitude-limiting is reasonably designed, the power factor (PF) and total harmonics distortion (THD) can be comply with the standard requirements.

When the boost PFC converter in the AC-to-DC converter 200 is operated under the continuous current mode (CCM), the switching frequency thereof can be selected by the conditions of that the lowest switching frequency does have to greater than 20 kHz within the acceptable input range, so as to avoid the generation of the audio-frequency noise, but in case that the reasonable tolerance is considered, the lowest set switching frequency is generally not lower than 30 kHz, and the switching frequency (fs) can be determined and calculated by the following expression (3):

$$fs = \frac{V_{ac}\sin \omega t \times (Vo - V_{ac}\sin \omega t)}{L_b \times Vo \times i_{Lb\_pk}}. \tag{3}$$

In foregoing expression (3), V$_{ac}$ sin ωt represents that the instant of the input voltage, L$_b$ represents that the inductance of the inductor Lb, and Vo represents that the amplitude of the DC output voltage Vo.

Figure 4:
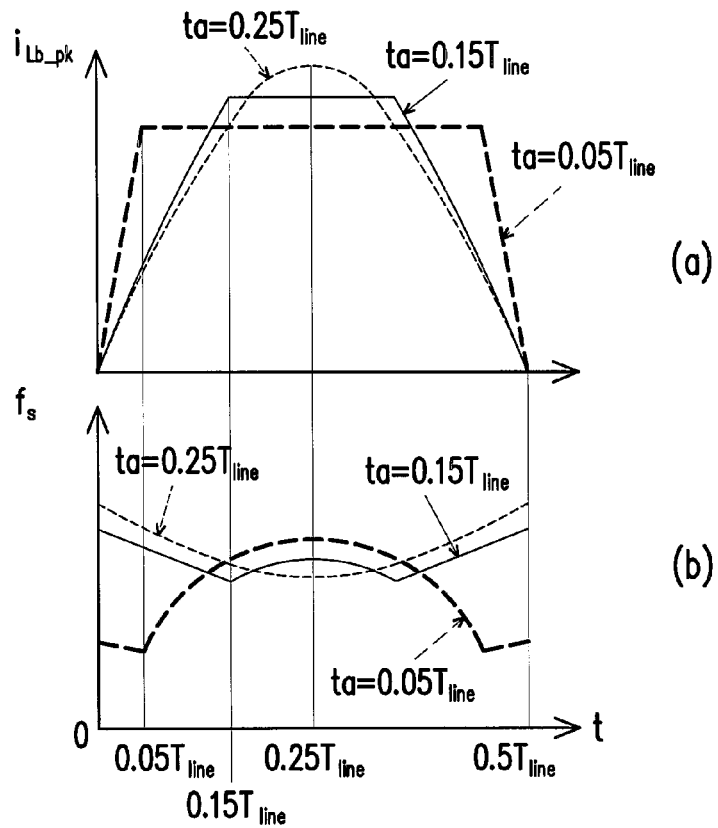
FIG. 4(a)-4(b) are a relationship between ($i_{Lb\_pk}$, fs, ta) in FIGS. 2 and 3(a)-3(c).

The waveforms of i$_{Lb\_pk}$ during 0–T$_{line}$/2 are shown in FIG. 4(a) in case that the start points of signal amplitude-limiting are at ta=0.05T$_{line}$, ta=0.15T$_{line}$ and ta=0.25T$_{line}$, respectively. Obviously, the amplitude of i$_{Lb\_pk}$ decreases as the start point ta of signal amplitude-limiting decreases. When the inductor Lb is constant, the switching frequencies fs respectively corresponding to different i$_{Lb\_pk}$ are shown as FIG. 4(b). It is clearly seen from FIG. 4(b) that when the inductor Lb is constant, if the start point ta of signal amplitude-limiting is getting smaller and smaller, then the amplitude of i$_{Lb\_pk}$ is getting smaller and smaller, and further the minimum of the switching frequency fs is also getting smaller and smaller. Accordingly, if the inductor Lb is designed based on the lowest switching frequency fs, the inductor Lb can be decreased by a means of signal amplitude-limiting.

At this time, the effective cross section area (A$_e$) of the magnetic core of the inductor Lb can be determined and calculated by the following expression (4):

$$A_e = \frac{L_b \times i_{Lb\_pk\_max}}{N \times B_{max}}. \tag{4}$$

In foregoing expression (4), L$_b$ represents that the inductance of the inductor Lb, i$_{Lb\_pk\_max}$ represents that the maximum peak current of the inductor Lb, N represents that the number of turns of the inductor Lb, and B$_{max}$ represents that the maximum magnetic flux density. Accordingly, i$_{Lb\_pk\_max}$ can be decreased by reasonably designing the relationship of resistors (Rb1, Rb2), so as to decrease the volume of the inductor Lb, and thus achieving the purpose of increasing the power density of the AC-to-DC converter 200.

Figure 5:
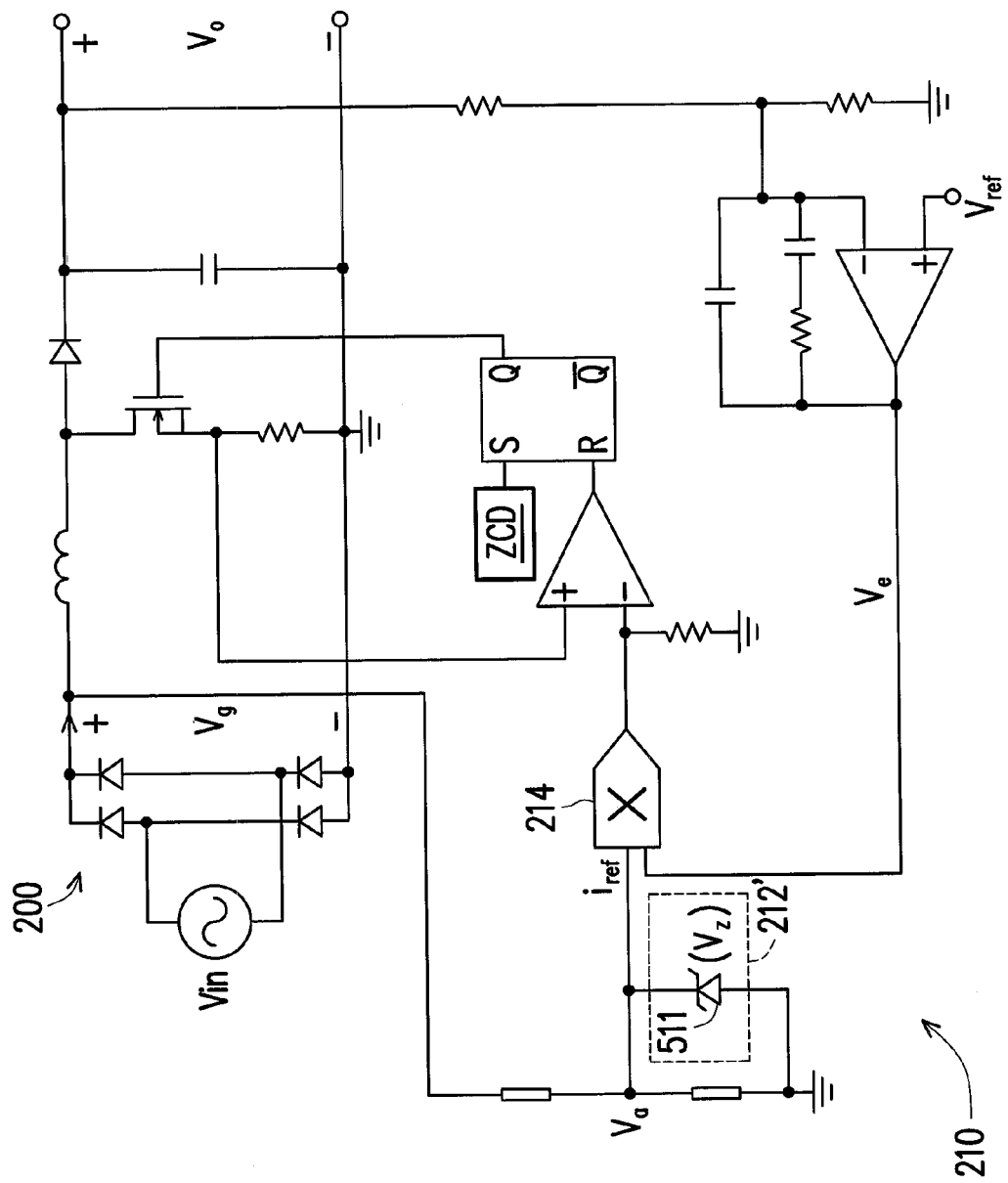
FIG. 5 is another implementation diagram of the power supply apparatus 10 of FIG. 1.

FIG. 5 is another implementation diagram of the power supply apparatus 10 of FIG. 1. Referring to FIGS. 2 and 5, in FIG. 5, the configuration of the power-factor-correction (PFC) circuit in the AC-to-DC converter 200 is similarly the boost PFC converter, and the control unit 210 similarly controls the operation of the AC-to-DC converter 200 under the boundary current mode (BCM).

The difference between FIGS. 2 and 5 is that the configuration of the amplitude-limiting circuit 212' of FIG. 5 is different from that of the amplitude-limiting circuit 212 of FIG. 2. To be specific, as shown in FIG. 5, the amplitude-limiting circuit 212' is composed of a voltage-regulator diode 511. In this case, the cathode of the voltage-regulator diode 511 is configured to receive the sampling signal Va and connected to the first input terminal of the multiplying circuit 214, and the anode of the voltage-regulator 511 is grounded.

Figure 6:
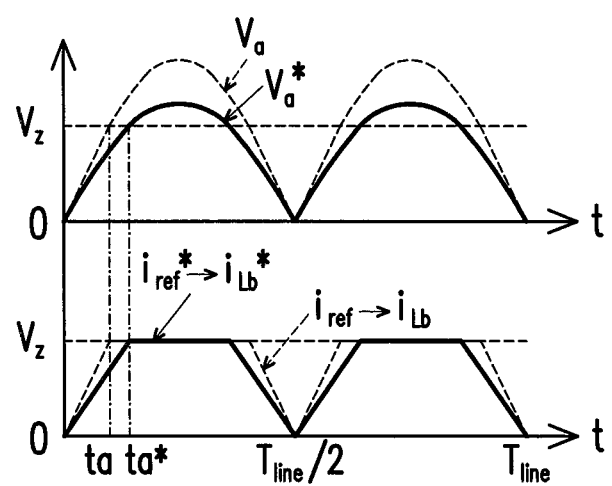
FIG. 6 is a part of operation waveforms (Va, $i_{ref}$) of the power supply apparatus 10 in FIG. 5.

In this exemplary embodiment, the output (i$_{ref}$) of the amplitude-limiting circuit 212' is generated by comparing the sampling signal Va with the voltage-regulator value (Vz) of the voltage-regulator diode 511. As the waveform of i$_{ref}$ shown in FIG. 6, the start point to of signal amplitude-limiting changes as the amplitude of input voltage (i.e. the rectified voltage Vg) changes (please see the relationship of Va and Va*). If Va>Va*, then ta<ta*, so the aberration rate of i$_{ref}$ is greater than that of i$_{ref}$*. Accordingly, the aberration rate of i$_{Lb}$ is greater than that of i$_{Lb}$*. Obviously, the power supply apparatus 10 as shown in FIG. 5 can be applied in the applications/occasions that the power factor (PF) changes with different input voltage. Moreover, the power supply apparatus 10 as shown in FIG. 5 does have higher PF in case that the lower voltage is input.

Figure 7:
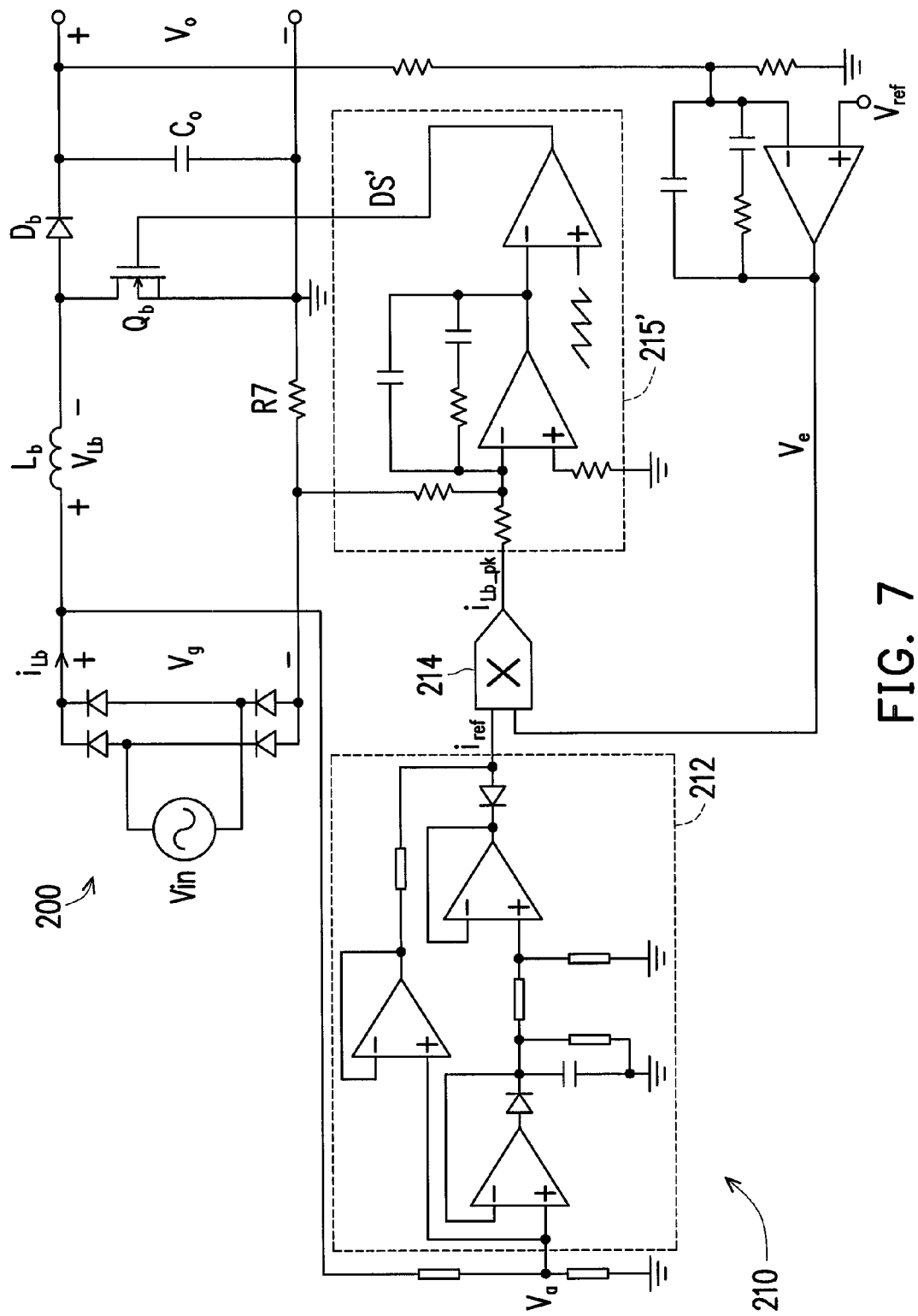
FIG. 7 is another implementation diagram of the power supply apparatus 10 of FIG. 1.

FIG. 7 is another implementation diagram of the power supply apparatus 10 of FIG. 1. Referring to FIGS. 2 and 7, in FIG. 7, the configuration of the power-factor-correction (PFC) circuit in the AC-to-DC converter 200 is similarly the boost PFC converter, and the control unit 210 similarly controls the operation of the AC-to-DC converter 200 under the continuous current mode (CCM).

The difference between FIGS. 2 and 7 is that the configuration of the signal modulation circuit 215' of FIG. 7 is different from that of the signal modulation circuit 215 of FIG. 2. To be specific, as shown in FIG. 7, the signal modulation circuit 215' is a pulse-width-modulation (PWM) circuit, such that the signal modulation circuit 215' would perform a PWM process on the product signal i$_{Lb\_pk}$ obtained by multiplying i$_{ref}$ by Ve, so as to generate a (PWM) driving signal DS' to control the switching of the main power switch Qb in the AC-to-DC converter 200. In this case, as shown in FIG. 7, the resistor Rcs of FIG. 1 is omitted, so the main power switch Qb is changed to be connected between the ground potential and the common node of the inductor Lb and the diode Db. Moreover, a resistor R7 is additionally connected between the negative (−) of the rectified voltage Vg and the ground potential, and the common node of the negative (−) of the rectified voltage Vg and the resistor R7 is connected to the signal modulation circuit 215'.

Figure 8:
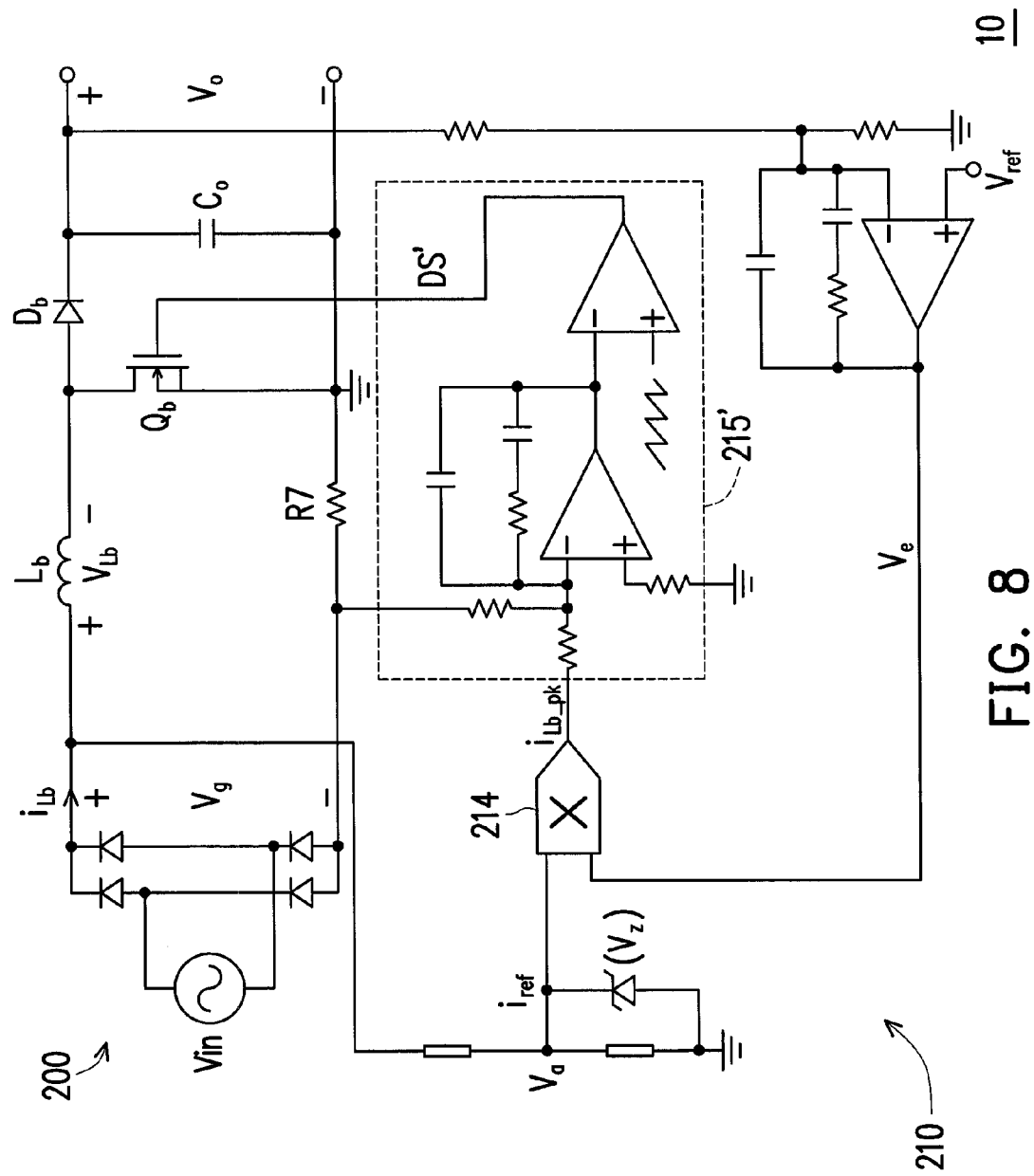
FIG. 8 is another implementation diagram of the power supply apparatus 10 of FIG. 1.

FIG. 8 is another implementation diagram of the power supply apparatus 10 of FIG. 1. Referring to FIGS. 5 and 8, in FIG. 8, the configuration of the power-factor-correction (PFC) circuit in the AC-to-DC converter 200 is similarly the boost PFC converter, and the control unit 210 similarly controls the operation of the AC-to-DC converter 200 under the continuous current mode (CCM).

The difference between FIGS. 5 and 8 is that the configuration of the signal modulation circuit 215' of FIG. 8 is different from that of the signal modulation circuit 215 of FIG. 5. To be specific, as shown in FIG. 8, the signal modulation circuit 215' is a pulse-width-modulation (PWM) circuit, such that the signal modulation circuit 215' would perform a PWM process on the product signal $i_{Lb\_pk}$ obtained by multiplying $i_{ref}$ by Ve, so as to generate a (PWM) driving signal DS' to control the switching of the main power switch Qb in the AC-to-DC converter 200. In this case, the configuration of the AC-to-DC converter 200 in FIG. 8 is similar to that of the AC-to-DC converter 200 in FIG. 7.

Figure 9:
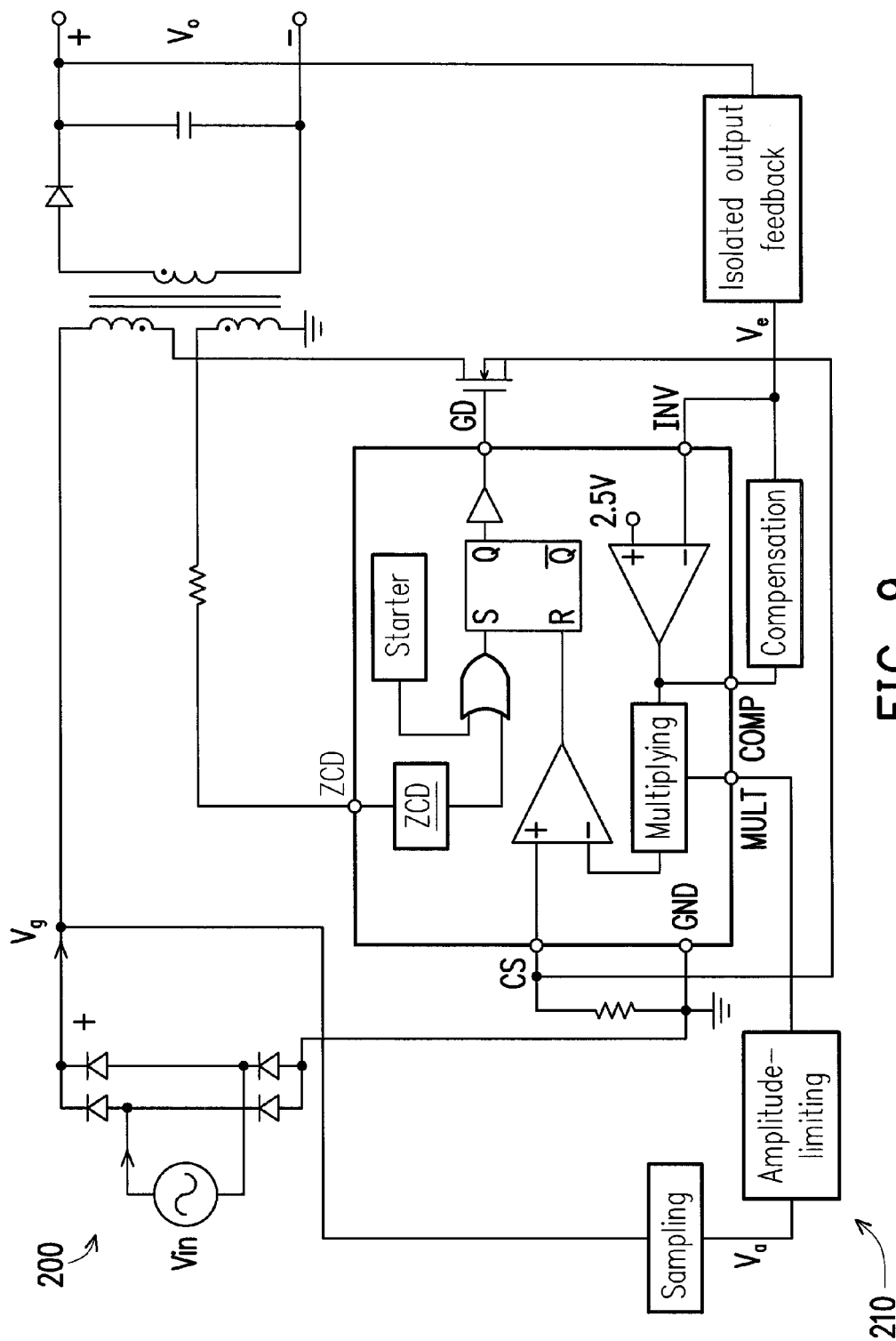
FIG. 9 is another implementation diagram of the power supply apparatus 10 of FIG. 1.

FIG. 9 is another implementation diagram of the power supply apparatus 10 of FIG. 1. Referring to FIG. 9, in FIG. 9, the configuration of the power-factor-correction (PFC) circuit in the AC-to-DC converter 200 is the flyback PFC converter, and the control unit 210 controls the operation of the AC-to-DC converter 200 under the boundary current mode (BCM). In this exemplary embodiment, the power control structure of the power supply apparatus 10 in FIG. 9 can be similar to that of the power supply apparatus 10 in FIG. 2 or FIG. 5, so the details thereto should be omitted.

Figure 10:
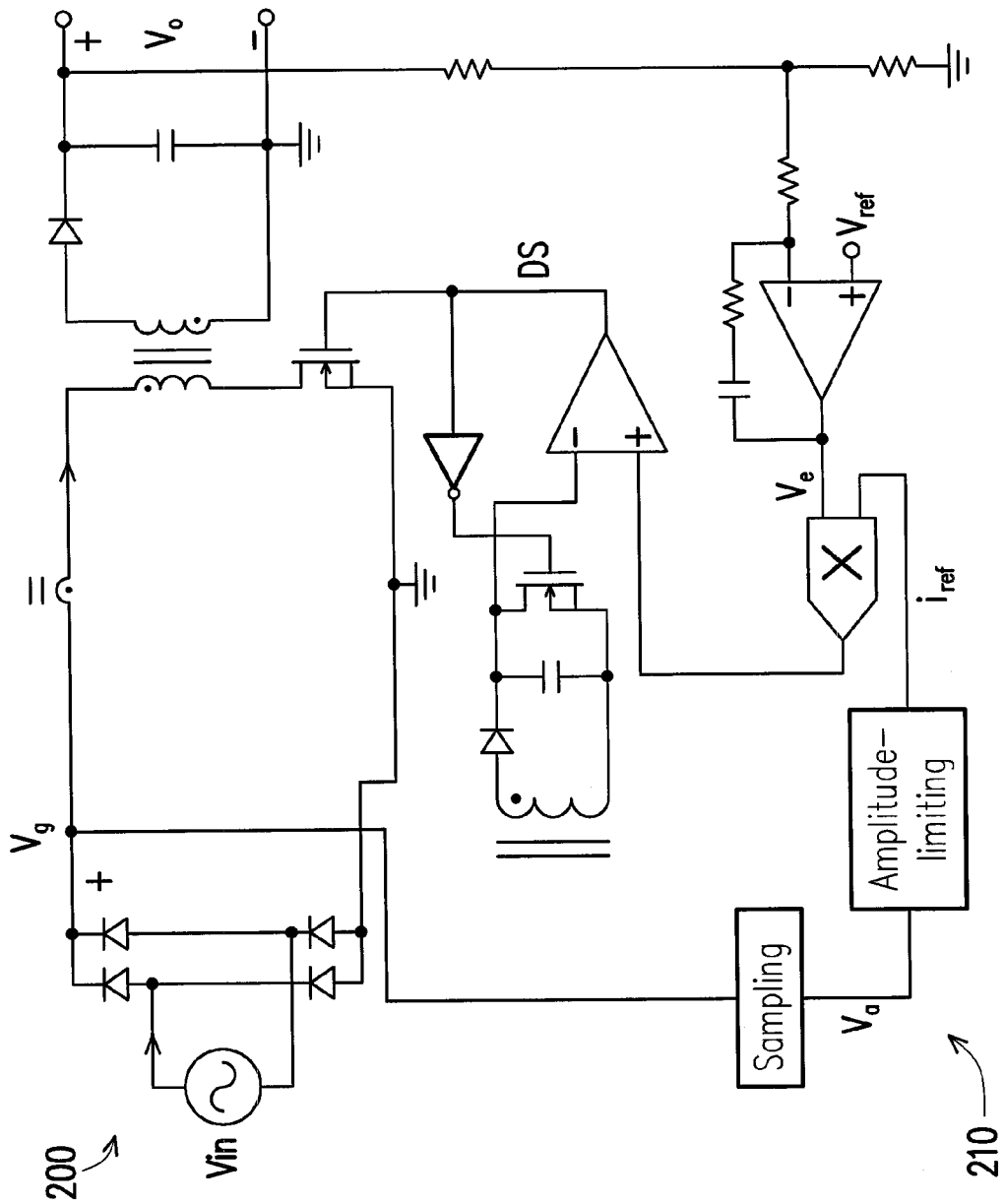
FIG. 10 is another implementation diagram of the power supply apparatus 10 of FIG. 1.

FIG. 10 is another implementation diagram of the power supply apparatus 10 of FIG. 1. Referring to FIG. 10, in FIG. 10, the configuration of the power-factor-correction (PFC) circuit in the AC-to-DC converter 200 is similarly the flyback PFC converter, and the control unit 210 controls the operation of the AC-to-DC converter 200 under the CCM. In this exemplary embodiment, the power control structure of the power supply apparatus 10 in FIG. 10 can also be similar to that of the power supply apparatus 10 in FIG. 2 or FIG. 5, so the details thereto should be omitted.

Figure 11:
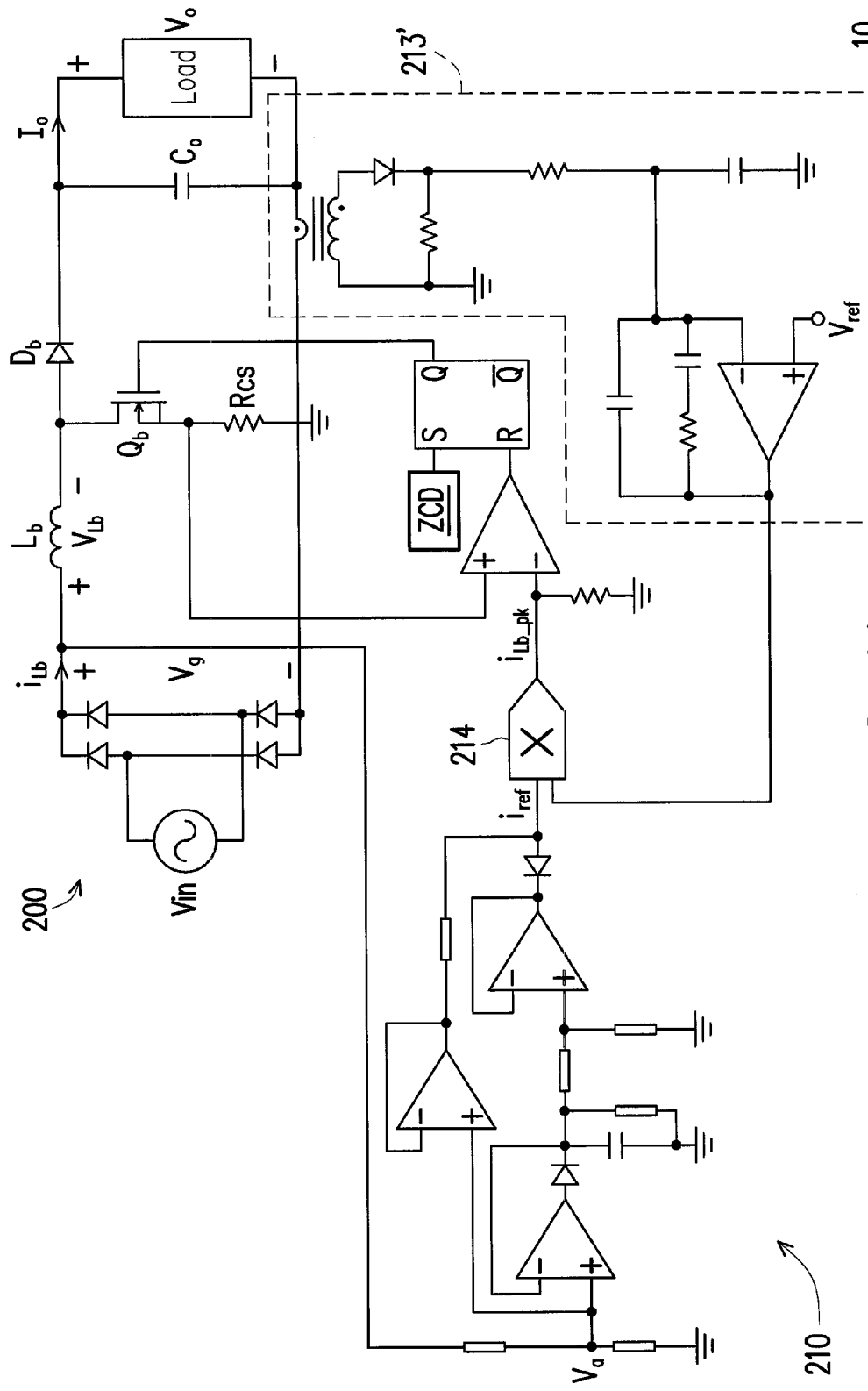
FIG. 11 is another implementation diagram of the power supply apparatus 10 of FIG. 1.

FIG. 11 is another implementation diagram of the power supply apparatus 10 of FIG. 1. Referring to FIGS. 2 and 11, the difference between FIGS. 2 and 11 is that the configuration of the output feedback circuit 213' of FIG. 11 is different from that of the output feedback circuit 213 of FIG. 2. To be specific, as shown in FIG. 11, the output feedback circuit 213' is a current transformer output feedback circuit, such that the output feedback signal Ve is an error signal corresponding to a difference between the output current Io of the AC-to-DC converter 200 and the reference signal Vref. Moreover, the power control structure of the power supply apparatus 10 in FIG. 11 is also similar to that of the power supply apparatus 10 in FIG. 2, so the details thereto should be omitted.

Figure 12:
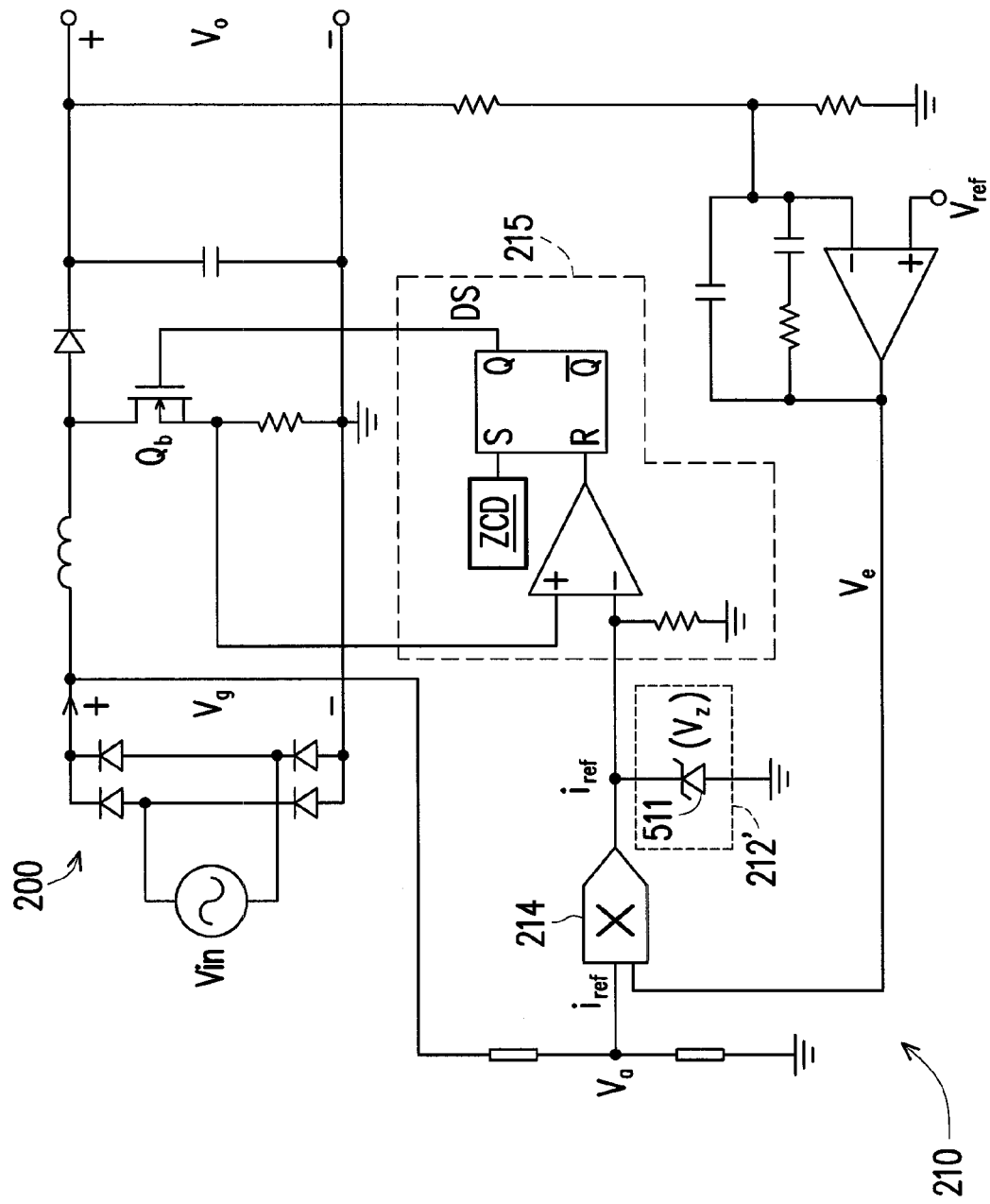
FIG. 12 is another implementation diagram of the power supply apparatus 10 of FIG. 1.

FIG. 12 is another implementation diagram of the power supply apparatus 10 of FIG. 1. Referring to FIGS. 5 and 12, the difference between FIGS. 5 and 12 is that, as shown in FIG. 12, the amplitude-limiting circuit 212' is changed to be connected between the multiplying circuit 214 and the signal modulation circuit 215. In this case, the cathode of the voltage-regulator diode 511 is changed to be connected to the output terminal of the multiplying circuit 214, and the anode of the voltage-regulator diode 511 is also grounded. Moreover, the sampling signal Va is changed to be provided to the first input terminal of the multiplying circuit 214, the output feedback signal Ve is also provided to the second input terminal of the multiplying circuit 214, and the output terminal of the multiplying circuit 214 is also connected to the signal modulation circuit 215.

In this exemplary embodiment, the multiplying circuit 214 would multiply the sampling signal Va by the output feedback signal Ve, so as to obtain a product signal to be served as the reference ($i_{ref}$) of the current $i_{Lb}$ of the inductor Lb. If $i_{ref}$>Vz, then the amplitude of $i_{ref}$ ($i_{Lb}$) would be limited, and thus achieving the purpose of decreasing the volume of the inductor Lb. On the other hand, if $i_{ref}$<Vz, then $i_{ref}$ is directly output, so as to make sure that the higher PF can be obtained when the input current is smaller (i.e. the input voltage is larger and the amplitude of $i_{ref}$ ($i_{Lb}$) would not be limited).

Obviously, based on the configuration as shown in FIG. 12, for a power supply with full input-voltage range, if the input power is constant, the input current is maximum when the input voltage is minimum; otherwise, the input current is minimum when the input voltage is maximum. Accordingly, the effective cross section area ($A_e$) of the magnetic core of the inductor Lb can be only determined or selected by considering the maximum input current, namely, in case that the input current is maximum when the input voltage is minimum. In this exemplary embodiment, the higher PF can be surely obtained when the input current is smaller (i.e. input voltage is larger and the amplitude of $i_{ref}$ ($i_{Lb}$) would be limited).

Figure 13:
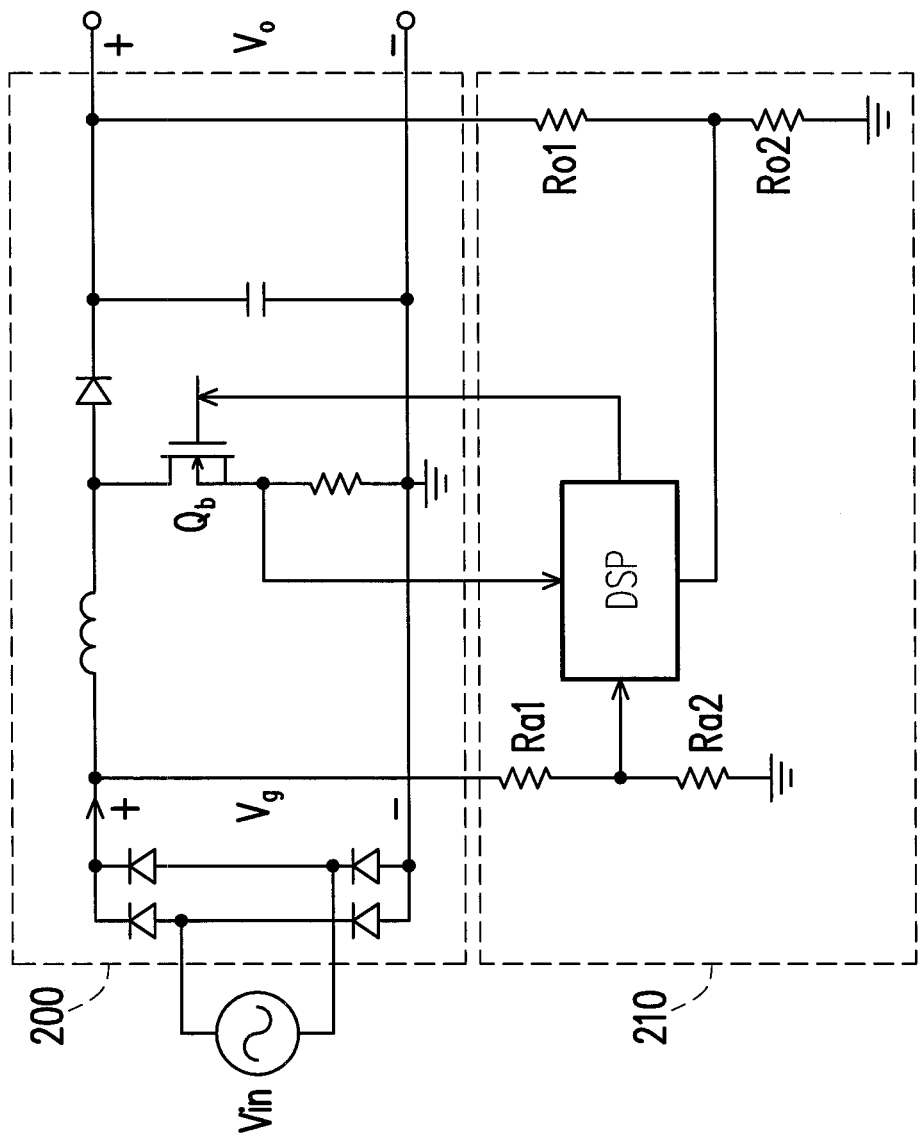
FIG. 13 is another implementation diagram of the power supply apparatus 10 of FIG. 1.

Of course, in the other exemplary embodiment as shown in FIG. 13, each of the control units 210 in the above exemplary embodiments can be implemented by at least a digital signal processor (DSP), but not limited thereto. In this case, the DSP can control the switching of the main power switch Qb in response to two sampling signals respectively from the resistors (Ra1, Ra2) and resistors (Ro1, Ro2), so as to achieve the similarly power control manner of the above exemplary embodiments.

Figure 14:
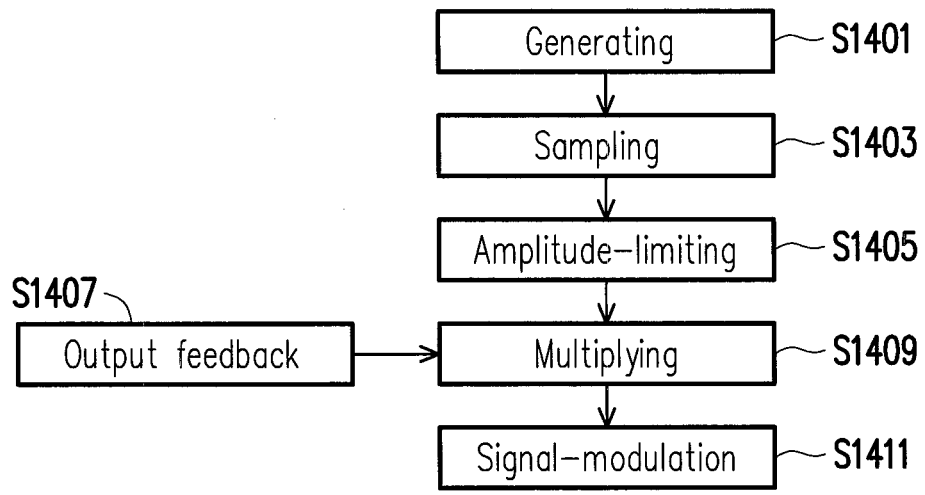
FIG. 14 is a flow chart of a power control method adapted to an AC-to-DC converter according to an exemplary embodiment of the invention.

Based on the teachings of the above exemplary embodiments, FIG. 14 is a flow chart of a power control method adapted to an AC-to-DC converter according to an exemplary embodiment of the invention. Referring to FIG. 14, the power control method in this exemplary embodiment includes the following steps of:

Making the AC-to-DC converter convert an AC input voltage in response to a driving signal, so as to generate a DC output voltage (step S1401);

Sampling a rectified voltage relating to the AC input voltage, so as to provide a sampling signal (step S1403);

Performing an amplitude-limiting process on the sampling signal (step S1405);

Providing an output feedback signal relating to an output of the AC-to-DC converter (step S1407);

Multiplying the amplitude-limited sampling signal by the output feedback signal, so as to provide a product signal (step S1409); and Performing a signal modulation on the product signal, so as to generate the driving signal to control the switching of the main power switch in the AC-to-DC converter (step S1411).

Figure 15:
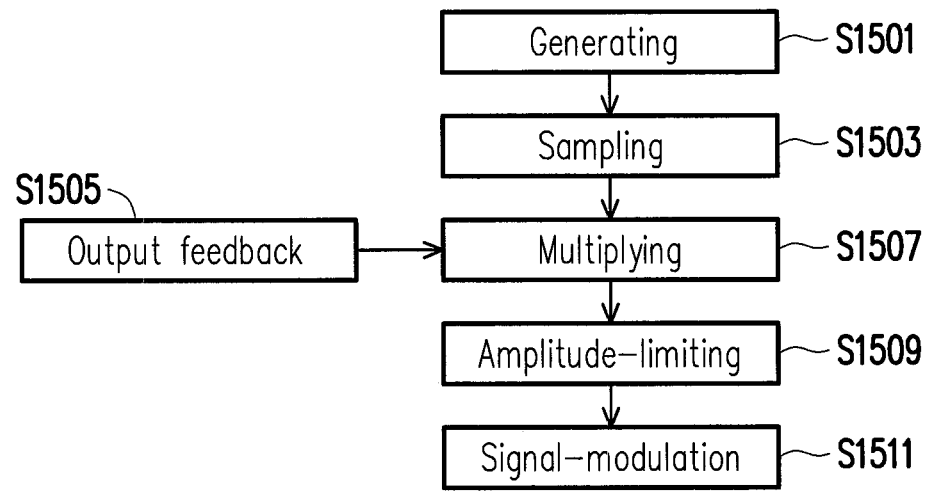
FIG. 15 is a flow chart of a power control method adapted to an AC-to-DC converter according to another exemplary embodiment of the invention.

On the other hand, FIG. 15 is a flow chart of a power control method adapted to an AC-to-DC converter according to another exemplary embodiment of the invention. Referring to FIG. 15, the power control method in this exemplary embodiment includes the following steps of:

Making the AC-to-DC converter convert an AC input voltage in response to a driving signal, so as to generate a DC output voltage (step S1501);

Sampling a rectified voltage relating to the AC input voltage, so as to provide a sampling signal (step S1503);

Providing an output feedback signal relating to an output of the AC-to-DC converter (step S1505);

Multiplying the sampling signal by the output feedback signal, so as to provide a product signal (step S1507);

Performing an amplitude-limiting process on the product signal (step S1509); and Performing a signal modulation on the amplitude-limited product signal, so as to generate the driving signal to control the switching of the main power switch in the AC-to-DC converter (step S1511).

In the exemplary embodiments of FIGS. 14 and 15, when the output of the AC-to-DC converter is the DC output voltage of the AC-to-DC converter, the output feedback signal in step S1407 or S1505 can be an error signal corresponding to a difference between the DC output voltage and a reference signal. Moreover, when the output of the AC-to-DC converter is an output current of the AC-to-DC converter, the output feedback signal in step S1407 or S1505 can be an error signal corresponding to a difference between the output current and a reference signal. Furthermore, in step S1411 or S1511, the signal modulation process can be a pulse-width-modulation (PWM) process but not limited thereto.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply apparatus, comprising:
   an AC-to-DC converter, configured to receive an AC input voltage, and convert the AC input voltage in response to a driving signal, so as to generate a DC output voltage; and
   a control unit, connected to the AC-to-DC converter, and configured to generate the driving signal to control a switching of a main power switch in the AC-to-DC converter under an continuous current mode (CCM) or an boundary current mode (BCM), wherein the control unit comprises:
      a sampling circuit, configured to sample a rectified voltage relating to the AC input voltage, so as to provide and output a sampling signal;
      an output feedback circuit, configured to provide and output an output feedback signal relating to an output of the AC-to-DC converter;
      a multiplying circuit, configured to multiply the sampling signal by the output feedback signal, so as to provide and output a product signal;
      a signal modulation circuit, configured to perform a signal modulation on the product signal, so as to generate the driving signal; and
      an amplitude-limiting circuit, connected between the sampling circuit and the multiplying circuit or between the multiplying circuit and the signal modulation circuit, and configured to perform an amplitude-limiting process on an output of the sampling circuit or an output of the multiplying circuit, so as to limit a peak voltage level of the output of either the sampling circuit or the multiplying circuit at a constant voltage, wherein an output of the amplitude-limiting circuit is equivalent to the sampling signal if the sampling signal of the output of either the sampling circuit or the multiplying circuit is less than the constant voltage, while the output of the amplitude-limiting circuit is equivalent to the constant voltage if the sampling signal of the output of either the sampling circuit or the multiplying circuit is greater than the constant voltage.

2. The power supply apparatus according to claim 1, wherein in case that the amplitude-limiting circuit is coupled between the sampling circuit and the multiplying circuit, the amplitude-limiting circuit comprises:
   a first operational amplifier, having a positive input terminal receiving the sampling signal;
   a second operational amplifier, having a positive input terminal connected to the positive input terminal of the first operational amplifier, and a negative input terminal and an output terminal coupled with each other;
   a first diode, having an anode connected to an output terminal of the first operational amplifier, and a cathode connected to a negative input terminal of the first operational amplifier;
   a capacitor, having a first terminal connected to the cathode of the first diode, and a second terminal being grounded;
   a first resistor, coupled with the capacitor in parallel;
   a second resistor, having a first terminal connected to the cathode of the first diode;
   a third resistor, having a first terminal connected to a second terminal of the second resistor, and a second terminal being grounded;
   a third operational amplifier, having a positive input terminal connected to the second terminal of the second resistor, and a negative input terminal and an output terminal coupled with each other;
   a second diode, having a cathode connected to the output terminal of the third operational amplifier, and an anode connected to a first input terminal of the multiplying circuit; and
   a fourth resistor, having a first terminal connected to the output terminal of the second operational amplifier, and a second terminal connected to the anode of the second diode.

3. The power supply apparatus according to claim 2, wherein:
   the output feedback signal is provided to a second input terminal of the multiplying circuit, and the multiplying circuit further has an output ten final providing and outputting the product signal to the signal modulation circuit; and
   the sampling signal is a voltage-dividing signal.

4. The power supply apparatus according to claim 3, wherein when the output of the AC-to-DC converter is the DC output voltage of the AC-to-DC converter, the output feedback signal is an error signal corresponding to a difference between the DC output voltage and a reference signal.

5. The power supply apparatus according to claim 4, wherein the signal modulation process is a pulse-width-modulation (PWM) process.

6. The power supply apparatus according to claim 3, wherein when the output of the AC-to-DC converter is an output current of the AC-to-DC converter, the output feedback signal is an error signal corresponding to a difference between the output current and a reference signal.

7. The power supply apparatus according to claim 1, wherein in case that the amplitude-limiting circuit is coupled between the sampling circuit and the multiplying circuit, the amplitude-limiting circuit comprises:

a voltage-regulator diode, having a cathode receiving the sampling signal and connected to a first input terminal of the multiplying circuit, and an anode being grounded.

8. The power supply apparatus according to claim 7, wherein:
the output feedback signal is provided to a second input terminal of the multiplying circuit, and the multiplying circuit further has an output terminal providing and outputting the product signal to the signal modulation circuit; and
the sampling signal is a voltage-dividing signal.

9. The power supply apparatus according to claim 8, wherein the output of the AC-to-DC converter is the DC output voltage of the AC-to-DC converter, and the output feedback signal is an error signal corresponding to a difference between the DC output voltage and a reference signal.

10. The power supply apparatus according to claim 9, wherein the signal modulation process is a pulse-width-modulation (PWM) process.

11. The power supply apparatus according to claim 1, wherein in case that the amplitude-limiting circuit is coupled between the multiplying circuit and the signal modulation circuit, the amplitude-limiting circuit comprises:
a voltage-regulator diode, having a cathode connected to an output terminal of the multiplying circuit, and an anode being grounded.

12. The power supply apparatus according to claim 11, wherein:
the sampling signal is provided to a first input terminal of the multiplying circuit and is a voltage-dividing signal; and
the output feedback signal is provided to a second input terminal of the multiplying circuit, and the output terminal of the multiplying circuit provides and outputs the product signal to the signal modulation circuit.

13. The power supply apparatus according to claim 12, wherein the output of the AC-to-DC converter is the DC output voltage of the AC-to-DC converter, and the output feedback signal is an error signal corresponding to a difference between the DC output voltage and a reference signal.

14. The power supply apparatus according to claim 1, wherein the control unit is implemented by at least a digital signal processor.

15. The power supply apparatus according to claim 1, wherein the power supply apparatus is an AC-to-DC power supply apparatus.

16. A power control method, adapted to an AC-to-DC converter, the power control method comprising:
making the AC-to-DC converter convert an AC input voltage in response to a driving signal, so as to generate a DC output voltage;
sampling a rectified voltage relating to the AC input voltage, so as to provide a sampling signal;
providing an output feedback signal relating to an output of the AC-to-DC converter;
multiplying the sampling signal by the output feedback signal, so as to provide a product signal;
performing a signal modulation on the product signal, so as to generate the driving signal to control a switching of a main power switch in the AC-to-DC converter under an continuous current mode (CCM) or an boundary current mode (BCM); and
performing an amplitude-limiting process on the sampling signal or the product signal, so as to limit a peak voltage level of either the sampling signal or the product signal at a constant voltage, wherein an output of the amplitude-limiting process is equivalent to the sampling signal if either the sampling signal or the product signal is less than the constant voltage, while the output of the amplitude-limiting process is equivalent to the constant voltage if either the sampling signal or the product signal is greater than the constant voltage.

17. The power control method according to claim 16, when the output of the AC-to-DC converter is the DC output voltage of the AC-to-DC converter, the output feedback signal is an error signal corresponding to a difference between the DC output voltage and a reference signal.

18. The power control method according to claim 16, wherein when the output of the AC-to-DC converter is an output current of the AC-to-DC converter, the output feedback signal is an error signal corresponding to a difference between the output current and a reference signal.

19. The power control method according to claim 16, wherein the signal modulation process is a pulse-width-modulation (PWM) process.

20. A power control structure, adapted to an AC-to-DC converter, the power control structure comprising:
a sampling circuit, configured to sample a rectified voltage relating to an AC input voltage of the AC-to-DC converter, so as to provide and output a sampling signal;
an output feedback circuit, configured to provide and output an output feedback signal relating to an output of the AC-to-DC converter;
a multiplying circuit, configured to multiply the sampling signal by the output feedback signal, so as to provide and output a product signal;
a signal modulation circuit, configured to perform a signal modulation on the product signal, so as to generate the driving signal to control a switching of a main power switch in the AC-to-DC converter under an continuous current mode (CCM) or an boundary current mode (BCM); and
an amplitude-limiting circuit, coupled between the sampling circuit and the multiplying circuit or between the multiplying circuit and the signal modulation circuit, and configured to perform an amplitude-limiting process on an output of the sampling circuit or an output of the multiplying circuit, so as to limit a peak voltage level of the output of either the sampling circuit or the multiplying circuit at a constant voltage, wherein an output of the amplitude-limiting circuit is equivalent to the sampling signal if the sampling signal of the output of either the sampling circuit or the multiplying circuit is less than the constant voltage, while the output of the amplitude-limiting circuit is equivalent to the constant voltage if the sampling signal of the output of either the sampling circuit or the multiplying circuit is greater than the constant voltage.

21. The power control structure according to claim 20, wherein in case that the amplitude-limiting circuit is coupled between the sampling circuit and the multiplying circuit, the amplitude-limiting circuit comprises:
a first operational amplifier, having a positive input terminal receiving the sampling signal;
a second operational amplifier, having a positive input terminal connected to the positive input terminal of the first operational amplifier, and a negative input terminal and an output terminal coupled with each other;
a first diode, having an anode connected to an output terminal of the first operational amplifier, and a cathode connected to a negative input terminal of the first operational amplifier;
a capacitor, having a first terminal connected to the cathode of the first diode, and a second terminal being grounded;

a first resistor, coupled with the capacitor in parallel;

a second resistor, having a first terminal connected to the cathode of the first diode;

a third resistor, having a first terminal connected to a second terminal of the second resistor, and a second terminal being grounded;

a third operational amplifier, having a positive input terminal connected to the second terminal of the second resistor, and a negative input terminal and an output terminal coupled with each other;

a second diode, having a cathode connected to the output terminal of the third operational amplifier, and an anode connected to a first input terminal of the multiplying circuit; and a fourth resistor, having a first terminal connected to the output terminal of the second operational amplifier, and a second terminal connected to the anode of the second diode.

22. The power control structure according to claim 20, wherein in case that the amplitude-limiting circuit is coupled between the sampling circuit and the multiplying circuit, the amplitude-limiting circuit comprises:

a voltage-regulator diode, having a cathode receiving the sampling signal and connected to a first input terminal of the multiplying circuit, and an anode being grounded.

23. The power control structure according to claim 20, wherein in case that the amplitude-limiting circuit is coupled between the multiplying circuit and the signal modulation circuit, the amplitude-limiting circuit comprises:

a voltage-regulator diode, having a cathode connected to an output terminal of the multiplying circuit, and an anode being grounded.

24. The power control structure according to claim 20, wherein when the output of the AC-to-DC converter is the DC output voltage of the AC-to-DC converter, the output feedback signal is an error signal corresponding to a difference between the DC output voltage and a reference signal.

25. The power control structure according to claim 20, wherein when the output of the AC-to-DC converter is an output current of the AC-to-DC converter, the output feedback signal is an error signal corresponding to a difference between the output current and a reference signal.

26. The power control structure according to claim 20, wherein the signal modulation process is a pulse-width-modulation (PWM) process.

\* \* \* \* \*